K. KIEFER.
MULTIPLE FILTERING OR PERCOLATING APPARATUS.
APPLICATION FILED DEC. 24, 1913.
1,175,640.
Patented Mar. 14, 1916.
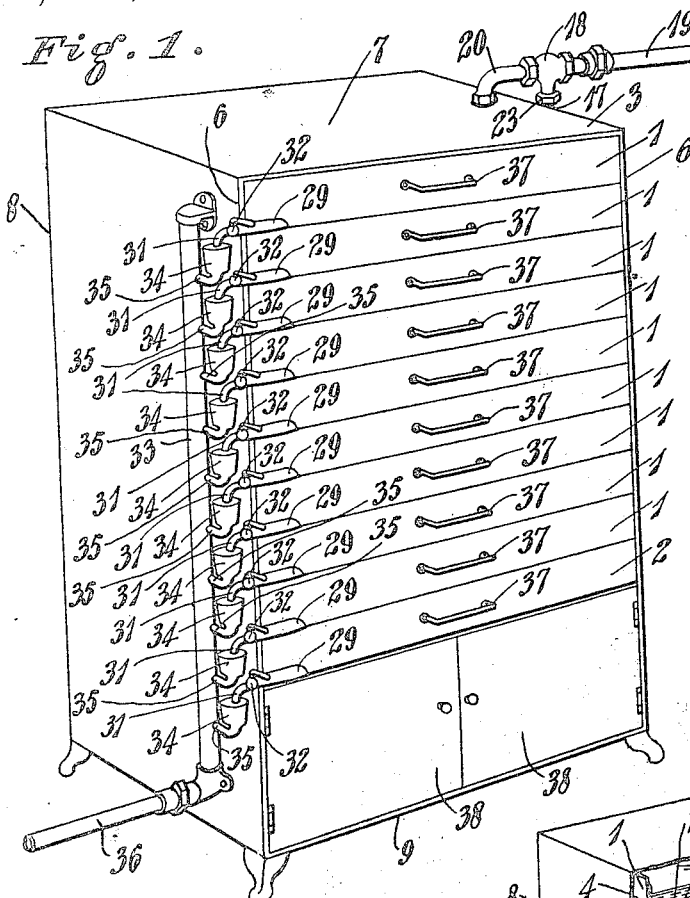
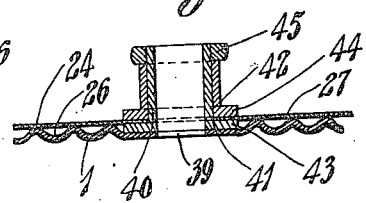
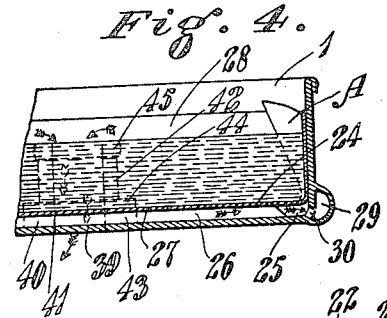
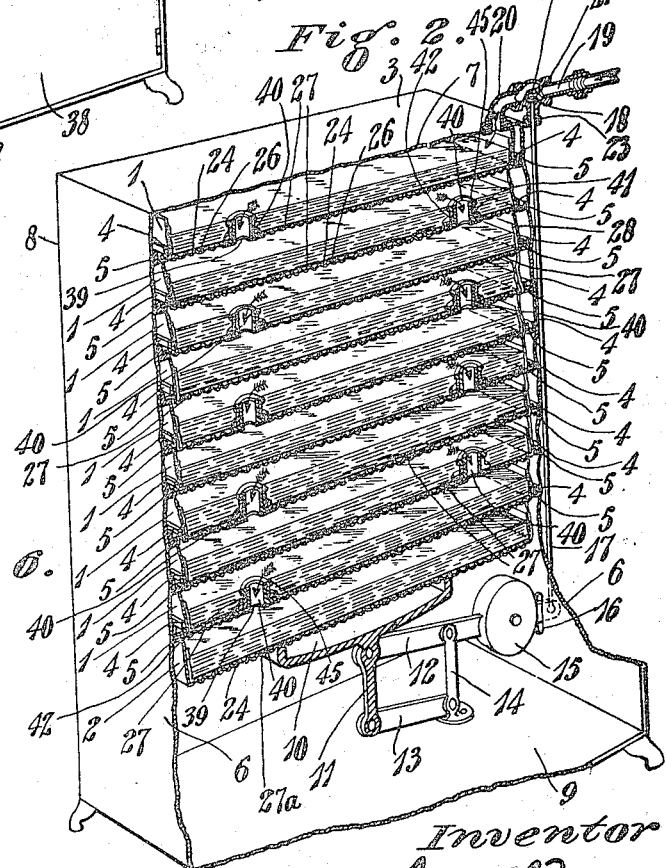
Inventor
Karl Kiefer

UNITED STATES PATENT OFFICE.

KARL KIEFER, OF CINCINNATI, OHIO.

MULTIPLE FILTERING OR PERCOLATING APPARATUS.

1,175,640.

Specification of Letters Patent. Patented Mar. 14, 1916.

Application filed December 24, 1913. Serial No. 808,603.

*To all whom it may concern:*

Be it known that I, KARL KIEFER, a citizen of the United States, and a resident of Cincinnati, in the county of Hamilton and State of Ohio, have invented certain new and useful Improvements in Multiple Filtering or Percolating Apparatus, of which the following is a specification.

My invention relates to filters and percolators or the like, and has for its object the thorough filtration or percolation of liquids in considerable volume, without requiring much attention, and with the apparatus simplified so as to make the first cost and the cost of operation low.

My invention consists in the parts and in the details of construction and arrangement of parts as will hereinafter be more fully described and claimed.

In the drawing: Figure 1 is a general perspective view of apparatus embodying my invention; Fig. 2 is a sectional perspective view of the same; Fig. 3 is an enlarged detail sectional view of one of the overflow-supply pipes and adjacent parts of the tray and filtering sheet; Fig. 4 is a sectional detail view of part of the tray near one of its front corners illustrating how the filtering sheet is placed in the tray; and also showing one of the overflow supply pipes in dotted lines, and especially showing the outlet; Fig. 5 is a detail perspective view of one of the filtering sheets, showing how it is folded for insertion into the tray; Fig. 6 is a detail perspective view of one of the trays removed from the apparatus and without the filtering sheet in place therein, and with the fastening means removed from the overflow-supply pipe; and Fig. 7 is a sectional detail view, showing modified channel-forming means.

As I prefer to construct my invention, a series of trays 1 and an additional tray 2 are contained in a cabinet 3. All of the trays 1 are preferably slid into the cabinet and supported therein by ledges 4 on their sides, engaging with rails 5 on the inner sides of the side walls 6 of the cabinet.

The lowermost tray 2, unlike the other trays 1, is slid into the cabinet on a bracket 10, which has a downwardly extending arm 11 rigid onto it, and which arm is pivoted to an upper beam 12 and a lower link 13, which are pivoted on a standard 14 that is fixed on the bottom 9 of the cabinet. The pivots of the beam 12 and link 13 are equally distant along the beam 12 and link 13 and along the arm 11 and standard 14, so that the bracket 10 may swing up and down without tilting. The beam 12 extends laterally past its pivot on the standard 14, and carries a counterweight 15, and extends farther out through a slot 16 in the side 6 of the cabinet, where it has the lower end of a connecting rod 17 pivoted to it. The upper part of this rod 17 extends into a valve body 18 and a supply pipe 19 connects through the valve body 18 and through an elbow 20 with the interior of the cabinet, said elbow 20 preferably having a tight connection with the top 7 of the cabinet where it extends through an opening therein. The upper end of the connecting rod 12, where it extends into the valve body 18, carries a conical valve 21, and if the weight in the lowermost tray 20 overbalances the counterweight 15, this conical valve 21 will be moved up against its seat 22 in the valve body. The connecting rod 17 may have a stuffing-cap 23 around it where it enters the valve body. Each one of the trays 1 and also the tray 2 has a corrugated bottom, with the corrugations 24 ending short distances away from the sides of the tray, so that narrow channels 25 are left, thereby affording universal connection between all of the channels 26 that are formed between the corrugations 24. In each tray, and resting upon the tops of the corrugations 24 and supported across the channels 26, is a filtering sheet 27, having its sides 28 folded upward to come against the sides of the tray. This folding is accomplished without removing any of the structure of the sheet, by giving the sheet diagonal folds at its corners in opposite direction from the longitudinal folds where the sides are folded up, as seen at A in Figs. 4 and 5. It is desirable for the folded-up sides 28 of the sheet not to make very close contact with the sides of the tray, for the same reason that the main part of the sheet is supported across the channels 26, *i. e.*, to allow liquid after passing through the sheet to travel between the sheet and the structure of the tray for delivery from the tray. With the sheet thus placed in the tray, the main horizontal part of the sheet, and the sides 28 in a lesser degree, will allow the liquid to pass through and will filter it. This filtration will take place under very low head or pressure because of the shallowness of the liquid in the tray, but practically the full area of the filtering sheet will be utilized, so that the minimized pressure is compensated for by maximized operative filtering area. Filtering in this manner at very low pressure allows the use of a filtering sheet of close texture which will filter the liquid very thoroughly and yet will not clog as would a similar filtering sheet operating under high pressure. Wire screen 24ª may be used instead of the corrugations 24, whereupon the bottoms of the trays may be smooth, as in the tray 1ª in Fig. 7.

To deliver the filtered liquid, each tray has at one of its front corners a small outlet pipe 29 fixed on it outside and communicating through a small opening or slot 30 with the forward channel 25 inside the tray under the filtering sheet 27. The inner end of the outlet pipe 29 is closed, but the outer end extends out past the corner of the tray and is provided with a spout 31 and stop-cock 32. A vertical manifold 33 is supported on the outside of the cabinet close to the front edge where the outlet pipes 29 with their spouts 32 come in substantially vertical alinement when the trays are placed in their operative positions in the cabinet; and cups 34, having nipples 35 entering the manifold 33, are arranged in vertical series, so that each one of the cups may receive the liquid from the spout 32 of a respective tray. The filtered liquid may then flow from the manifold 33 to any proper receptacle through the delivery pipe 36.

The trays 1 and the tray 2 are preferably provided with handles 37 for withdrawing them from the cabinet, and the lower part of the cabinet, where the mounting for the lower tray 2 is contained, is preferably closed by doors 38, the upper edges of the doors being kept far enough below the bottom of the tray 2 to allow it to go down as has been described. It will be understood that the movement of this tray need be only sufficient to seat or unseat the valve 21 in the inlet means.

Each one of the trays 1 is provided with an opening 39 through its bottom, with a short pipe 40 fixed on the bottom in alinement with the opening and extending up to the height, somewhat less than that of the folded-up sides 28 of the sheet 27, which it is required the liquid shall have in the tray, so that any excess of liquid entering the tray will flow over the upper edges of this pipe and down into the tray below. It will thus be seen that, with each of the trays thus provided with these pipes, and with the pipes staggered in the respective trays, so that the liquid coming down from the pipe in the upper tray will not enter directly into the pipe in the lower tray, all of the trays may be supplied from the inlet means in the top 7 of the cabinet, while excess of liquid in the lowermost one of the trays 1, next to the additional tray 2, will be discharged into this tray 2, which would overflow into the cabinet were it not for its mounting which has been described. With this mounting, the counterweight 15 may be so adjusted that, if the liquid in the lowermost tray rises to the maximum height allowed, the weight of this liquid will be such as to cause the tray to overbalance the counterweight 15 and close the inlet valve as has been described.

The filtering sheet 27 in each tray is provided with an opening 41 which fits down around the pipe 40, and a sleeve 42 fits around the pipe. The pipe 40 has a flange 43 extending out around it and giving it a wide bearing where it is attached to the bottom of the tray, and the sleeve 42 has a similar flange 44 with which it bears down on the part of the filtering sheet around the opening 41; and when the sleeve is clamped down tightly by a ring nut 45 which is screwed onto the upper end of the pipe 40 down against the upper end of the sleeve 42, said part of the filtering sheet 27 will be tightly clamped between the two flanges 43 and 44 and will act as a gasket, preventing flow of unfiltered liquid from above the sheet around the edge of this opening 41 and into the channels 26 under the filtering sheet.

From the foregoing it will be seen that each pipe 40 constitutes an overflow-supply pipe, since it is an overflow means for the tray in which it is provided and also constitutes a supply means for the trays below it.

The above described apparatus, filtering the liquid under low pressure but with augmented filtering area, not only due to the large available area of each sheet, but also to the duplication of the sheets and their operation in multiple, affords at once a means for very thoroughly filtering a liquid and yet for filtering it in considerable volume. The apparatus is therefore highly desirable as a water filter for use where large quantities of thoroughly filtered water are needed for drinking and for culinary and similar purposes, as in hotels, restaurants, hospitals and various other institutions where a local water filtering plant is practicable and necessary.

Owing to the gentle operation and the absence of clogging, the sediment being deposited very evenly over the surface of the sheet and not compacted, it is possible to use the sheets for a considerable length of time and for the filtration of a large quantity of liquid, and it is therefore unnecessary to give the filter any special attention for a considerable time; and when it is necessary to supply the new sheets this is done in the most convenient manner by simply drawing the trays out of the cabinet, unclamping the sleeve around the overflow pipe, removing the old sheet, inserting the new sheet properly folded as described, and again clamping the sleeve down.

By arranging the overflow-supply pipes in the various trays properly, the filtering sheets 27 may be symmetrical with reference to the opening 41 in them, and it is thus possible to punch the openings 41 in a large number of these sheets in advance, so that they may be very economically supplied. The sheet 27ª for the lowermost tray 2, of course, must not have any opening 41. All of the sheets may also be properly creased in large quantity in advance, so that they may be stored and transported flat and very conveniently folded when they are to be inserted into the trays.

It will be understood that while the apparatus is especially desirable for water filtration it will also be highly useful where any liquid requires thorough filtration in considerable volume. Also, substances from which extracts are to be made may be placed in layers in the containers, preferably upon the sheets 27, and the solvent liquid allowed to flow into the apparatus, and to thus percolate through the substance. This passage of the liquid through the apparatus may be repeated until the required strength of the extract has been obtained, and, with the sheets 27 provided, the liquid will be thoroughly filtered each time. Other adaptations may also occur, and it will also be understood that considerable modification in the details of construction is possible without departing from the scope and spirit of my invention, which is defined by the following claims.

I claim—

1. In a device of the character described, a plurality of containers containing filtering material, one being arranged over the other, overflow means for the upper container acting as the supply means to the lower container, means for supplying liquid to the upper container, means for preventing overflow of the lower container, and means for outlet of liquid from said containers.

2. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, means for preventing overflow of the container below the series, and means for outlet of liquid from the containers.

3. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, means whereby the weight on the container below the series prevents overflow of this container, and means for outlet of liquid from the containers.

4. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, means whereby the weight on the container below the series controls the supply of liquid to the uppermost container in the series, and means for outlet of liquid from the containers.

5. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, a yieldable support for the container below the series, and means whereby said support yields with this container upon increase of weight on the container and thereby prevents overflow of this container, and means for outlet of liquid from the containers.

6. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, a yieldable support for the container below the series, and means whereby said support yields under increase of weight on this container and affects the supply of liquid to the uppermost container of the series, and means for outlet of liquid from the containers.

7. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, a support for the container below the series, a fulcrumed beam carrying said support, a weight on the beam at the side of the fulcrum away from the support, a valve in the means for supplying liquid to the uppermost container in the series, connection from said beam to said valve whereby increase of weight on the container below the series moves the valve to shut off the liquid supply, and means for outlet of liquid from the containers.

8. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, means for preventing overflow of said container below the series, and means for conducting liquid away from the containers.

9. In a device of the character described, a plurality of superposed containers containing filtering material, overflow means for each container acting as the supply means for the container below, a container below the superposed series for which the overflow means of the lowermost container in the series acts as supply means, means for supplying liquid to the uppermost container in the series, means whereby the increase of amount of liquid in said container below the series prevents its overflow, and means for conducting liquid away from the containers.

10. In a device of the character described, a series of superposed containers, containing filtering material, overflow means for each container, said overflow means of the successive containers in the series being staggered, and this overflow means of each container discharging into the container below it and acting as a supply means to this lower container, means for supplying liquid to the uppermost container in the series, an additional container below the series, catching the liquid discharged from the overflow means of the lowermost container in the series, and means for conducting liquid away from the containers.

11. In a device of the character described, a series of superposed containers containing filtering material, overflow means for each container, said overflow means of the successive containers in the series being staggered, and this overflow means of each container discharging into the container below it and acting as a supply means to this lower container, means for supplying liquid to the uppermost container in the series, an additional container below the series, catching the liquid discharged from the overflow means of the lowermost container in the series, means for preventing overflow of the additional container, and means for conducting liquid away from the containers.

12. In a device of the character described, a series of superposed containers containing filtering material, overflow means for each container, said overflow means of the successive containers in the series being staggered, and this overflow means of each container discharging into the container below it and acting as a supply means to this lower container, means for supplying liquid to the uppermost container in the series, an additional container below the series, catching the liquid discharged from the overflow means of the lowermost container in the series, means acting on the supply means of the uppermost container and preventing overflow of the additional container, and means for conducting filtered liquid away from the containers.

13. In a device of the character described, a series of superposed containers containing filtering material, overflow means for each container, said overflow means of the successive containers in the series being staggered and this overflow means of each container discharging into the container below it and acting as a supply means to this lower container, an inlet pipe supplying liquid to be filtered to the uppermost container in the series, a valve in said inlet pipe, a container below the series receiving liquid overflowing from the lowermost container in the series, means whereby increase of liquid in this container below the series acts to close the valve in the inlet pipe, and means for conducting liquid away from the containers.

14. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, means for receiving and filtering the liquid coming from the overflow outlet of the lowermost container in the series, means supplying liquid to be filtered to the uppermost container in the series, and means for conducting filtered liquid away from the containers and said receiving and filtering means.

15. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, means for catching and filtering the liquid coming from the overflow outlet of the lowermost container in the series, means for preventing overflow of this receiving and filtering means, means supplying filtered liquid to the uppermost container in the series, and means for conducting filtered liquid away from the containers and said receiving and filtering means.

16. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, a supporting means for the containers of the series whereby they are supported in fixed relation to each other, receiving and filtering means receiving liquid coming from the overflow outlet of the lowermost container in the series, a mounting for the receiving and filtering means whereby it may yield downwardly, a supply pipe delivering liquid to be filtered to the uppermost container of the series, a valve in said supply pipe, operative connection from the yieldable mounting of the receiving and filtering means, whereby an excess of weight of liquid in the receiving and filtering means acts on the valve to close it, and means for conducting filtered liquid away from the containers and said receiving and filtering means.

17. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, supporting means for the containers into or out of which they may be slid sideways and in which they are supported in fixed relation to each other, an additional container below the superposed series, means forming liquid-conducting channels therein, a filtering sheet therein supported on the channel-forming means, said additional container receiving liquid coming from the overflow outlet of the lowermost container in the series, means supplying liquid to be filtered to the uppermost container in the series, means whereby an excess of liquid in this additional container below the series acts on the liquid supply, and means for conducting filtered liquid away from the containers of the series and away from said additional container.

18. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, supporting means for the containers into or out of which they may be slid sidewise and in which they are supported in fixed relation to each other, an additional container below the superposed series, means forming liquid-conducting channels therein, a filtering sheet therein supported on the channel-forming means, said additional container receiving liquid coming from the overflow outlet of the lowermost container in the series, a yieldable support for this additional container below the series, an inlet pipe supplying liquid to be filtered to the uppermost container of the series, a valve in the inlet pipe, and operative connection from the yieldable support to the valve, whereby an excess of weight of liquid in this additional container acts to close the valve, and means for conducting filtered liquid away from the containers of the series and away from said additional container.

19. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, supporting means for the containers into or out of which they may be slid sidewise and in which they are supported in fixed relation to each other, an additional container below the superposed series, means forming liquid-conducting channels therein, a filtering sheet therein supported on the channel-forming means, said additional container receiving liquid coming from the overflow outlet of the lowermost container in the series, a support for this additional container below the series upon which it may be slid sidewise into or out of position below the series, a fulcrumed beam carrying this support, a counterweight on the beam on the side of the fulcrum away from the support, an inlet pipe supplying liquid to be filtered to the uppermost container of the series, a valve in the inlet pipe, and means connecting said beam with said valve whereby increase of weight of liquid in the additional container below the series will act to close said valve, and means for conducting filtered liquid away from the containers of the series and away from said additional container.

20. In a device of the character described, a series of broad shallow containers, means forming conducting channels on the bottom of each container, a filtering sheet in each container supported on the channel-forming means, an overflow outlet in each container passing through the filtering sheet, said overflow outlets in the successive containers in the series being staggered, supporting means for the containers into or out of which they may be slid sidewise and in which they are supported in fixed relation to each other, an additional container below the superposed series, means forming liquid-conducting channels therein, a filtering sheet therein supported on the channel-forming means, said additional container receiving liquid coming from the overflow outlet of the lowermost container in the series, supporting means for this additional container below the series upon which it may be slid sidewise into or out of position below the series, inlet means supplying liquid to be filtered to the uppermost container in the series, means whereby an increase of liquid in the additional container below the series acts to control the supply of liquid through the inlet means, an outlet pipe on each container communicating with the channels formed in the container and projecting past the side of the container where it slides into the supporting means, and a similar outlet pipe on the additional container below the series, communicating with the channels formed in this container, and projecting out past the side of this container where it slides into position below the series, an upright manifold adjacent to the outlet pipes, and cups on and communicating with the interior of said manifold, each of said cups being under the outwardly projecting part of the outlet pipe on a respective container when the containers are in their superposed positions and when the additional container is in position below the series, and said outlet pipes discharging filtered liquid from their respective containers into the respective cups to be received in said manifold and conducted away from the filter.

21. In a device of the character described, an element comprising a container having an opening in its bottom, means in the container forming channels therein, a filtering sheet in the container and supported on the channel-forming means, and having an opening through it in alinement with the opening in the bottom, an overflow pipe, and liquid-tight connection therefor with the opening in the bottom and with the sheet.

22. In a device of the character described, an element comprising a container having an opening in its bottom, means in the container forming channels therein, a filtering sheet in the container and supported on the channel-forming means, and having an opening through it in alinement with the opening in the bottom, an overflow pipe, and liquid-tight connection therefor with the opening in the bottom and with the sheet, said connection being made by the sheet fitting down around the overflow pipe, and comprising a sleeve around the pipe and clamping means on the pipe, clamping the sleeve down on the filtering sheet around its opening and causing the part of the sheet around the opening to form a gasket around the overflow pipe to prevent flow of unfiltered liquid from above the filtering sheet to the channels below the filtering sheet.

23. In a device of the character described, an element comprising a container, means in the container forming liquid-conducting channels along its bottom, a filtering sheet supported in the container on the channel-forming means, said container having an opening in its bottom and said filtering sheet having an opening, an overflow pipe communicating with the opening in the bottom of the container and having a flange with which it bears upon and forms liquid-tight connection with the bottom of the container around the opening, said flange having its upper surface at about the level of the upper surfaces of the channel-forming means, whereby it receives the part of the filtering sheet around its opening with the overflow pipe extending up through the opening, a sleeve around the overflow pipe, and clamping means on the overflow pipe pressing the sleeve down on said part of the filtering sheet against said flange on the overflow pipe, whereby this part of the filtering sheet forms a gasket around the overflow pipe and prevents flow of unfiltered liquid from above the sheet to the channels below the sheet.

24. In a device of the character described, a series of superposed broad and shallow containers, means in each container forming channels along its bottom, an overflow pipe communicating through the bottom of each container and discharging the overflow from the container into the container below it in the series, means for receiving and filtering the liquid coming from the overflow pipe in the lowermost container of the series, and a filtering sheet in each of the containers in the series having an opening fitting around the overflow pipe in the container, each having its parts near its edges folded up along the sides of the container, and with its excess material at its corners folded inward without removal of any of the material, and means whereby the part of the sheet around the overflow pipe is compressed and forms a gasket around said pipe to prevent flow of unfiltered liquid from above the sheet to the channels below the sheet, an outlet pipe for each container communicating with the channels in the container, and means for receiving and conducting the filtered liquid away from the several outlet pipes.

25. In a device of the character described, an element comprising a container having an opening in its bottom, corrugations on the bottom of the container, a filtering sheet in the container and supported on said corrugations, and having an opening through it in alinement with the opening in the bottom, an overflow pipe in alinement with the opening in the bottom and extending through the opening in the sheet, a flange on the overflow pipe by which it is secured to the bottom, said flange being of substantially the height of the corrugations on the bottom and supporting the part of the sheet around the opening in the sheet, and clamping means around the overflow pipe clamping this part of the sheet down on said flange and causing this part of the sheet to form a gasket around the overflow pipe to prevent flow of unfiltered liquid from the above filtering sheet to the channels between the corrugations below the sheet.

In testimony whereof I have hereunto signed my name in the presence of two subscribing witnesses.

KARL KIEFER.

Witnesses:
   CLARENCE PERDEW,
   OTTO F. WINKELMANN.